United States Patent [19]

Tsukioka

[11] Patent Number: 4,532,379
[45] Date of Patent: Jul. 30, 1985

[54] FACSIMILE RELAYING METHOD

[75] Inventor: Yasunori Tsukioka, Atsugi, Japan

[73] Assignee: Ricoh Company, Ltd., Tokyo, Japan

[21] Appl. No.: 596,197

[22] Filed: Apr. 2, 1984

[30] Foreign Application Priority Data

Apr. 6, 1983 [JP] Japan .................................. 58-59195

[51] Int. Cl.³ ........................................... H04M 11/00
[52] U.S. Cl. .................................................. 179/2 R
[58] Field of Search ................... 179/2 R, 2 A, 2 DP, 179/18 B, 18 BD, 18 BE, 90 AD, 90 B, 90 BB, 90 BD; 358/256, 257, 280

[56] References Cited

U.S. PATENT DOCUMENTS 4,136,261 1/1979 Wada ................................... 179/2 R
4,274,114 6/1981 Kozima ......................... 179/2 DP X

FOREIGN PATENT DOCUMENTS 0084661 5/1982 Japan ................................. 179/2 R
0203365 12/1982 Japan ................................. 179/2 R Primary Examiner—Gene Z. Rubinson
Assistant Examiner—W. J. Brady
Attorney, Agent, or Firm—David G. Alexander

[57] ABSTRACT

A facsimile relaying method transmits common picture information to a plurality of facsimile receivers designated by a facsimile transmitter, by once storing transmit picture information in a picture store of a relaying apparatus and then sequentially sending it out to the receivers. If a telephone number of any of the designated receivers does not include a toll number, a toll number included in the telephone number of the transmitter is added to the telephone number of the transmitter. If the toll number of the telephone number of the receiver is identical with the toll number of the relaying apparatus, the toll number is omitted from the telephone number of the receiver.

7 Claims, 3 Drawing Figures

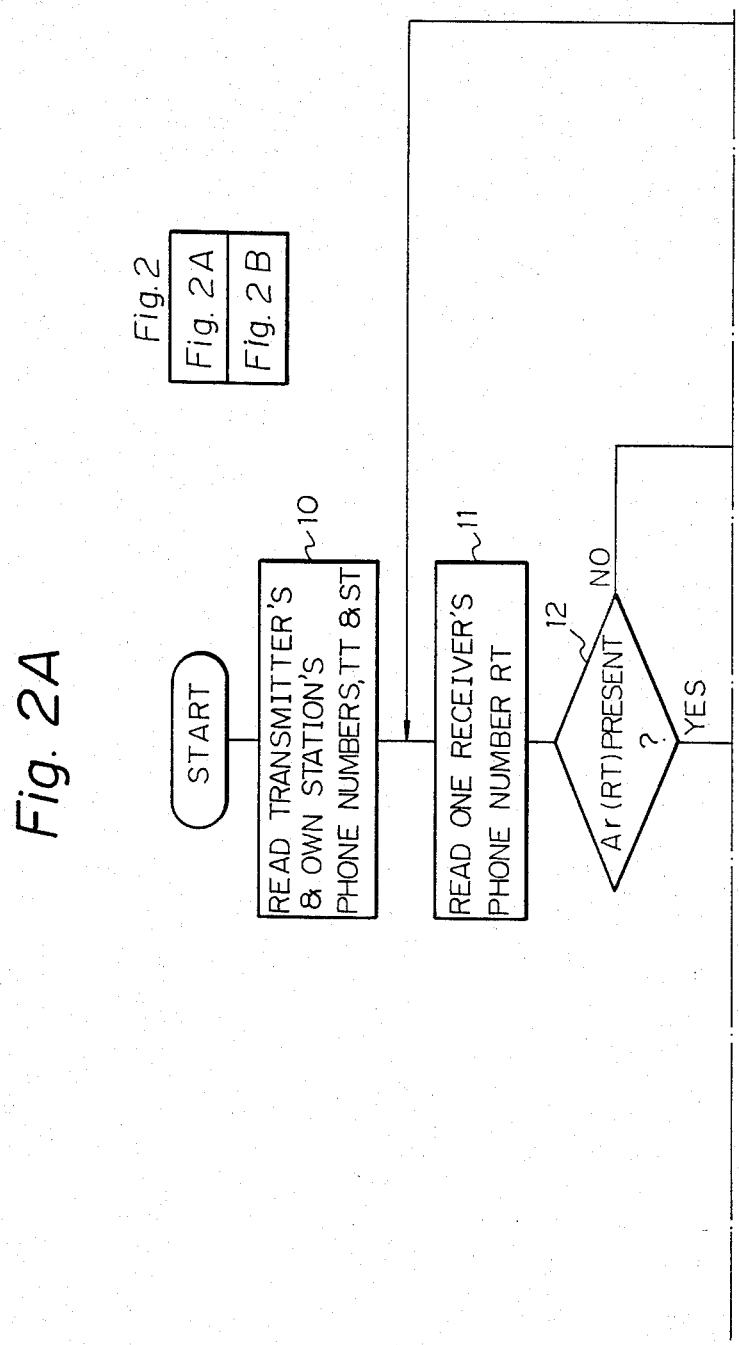

FACSIMILE RELAYING METHOD

BACKGROUND OF THE INVENTION

The present invention relates to a facsimile relaying method for transmitting common picture information to a plurality of facsimile receivers for a facsimile transmitter.

A facsimile communication system is available today which is of the type using a facsimile relay station to allow a facsimile transmitter to send same picture information to a plurality of remote facsimile receivers. In such a system, picture information sent out from the transmitter is once stored in a picture memory of the relay station and, then, sequentially transmitted therefrom to the receivers which the transmitter has designated.

In a communication system of the type described, the transmitter designates receivers relying on the operator's manipulation of a dial, that is, manual entry of telephone numbers assigned to the receivers. A problem encountered with this communication system is that due to carelessness the operator sometimes dial a wrong toll number or does not dial a toll number at all, failing to deliver picture information to the desired receivers.

SUMMARY OF THE INVENTION

It is therefore an object of the present invention to provide a facsimile relaying method which solves the problem discussed above and allows a minimum of operator's misdialling to occur in the concerned kind of facsimile communication.

It is another object of the present invention to provide a generally improved facsimile relaying method.

In one aspect of the present invention, there is provided a facsimile relaying method which once stores in a picture store of a facsimile relaying apparatus picture information which is transmitted from a facsimile transmitter and, then, transmits the stored picture information to a plurality of facsimile receivers which are designated by the facsimile transmitter. The method comprises the steps of adding a toll number included in a telephone number of the transmitter to a telephone number which designates any of the receivers, when the telephone number designating the facsimile receiver lacks a toll number, and omitting a toll number from the telephone number which designates the receiver when the toll number is identical with a toll number of the relaying apparatus.

In another aspect of the present invention, there is provided a facsimile relaying method which, using a facsimile relaying apparatus equipped with a telephone number data store, a picture data store and a central processing unit, sequentially transmits common picture information to a plurality of designated facsimile receivers for a facsimile transmitter. The method comprises the steps of receiving from the transmitter telephone number data associated with the transmitter, telephone number data associated with the designated receivers and picture data to be transmitted, storing the received telephone number data in the telephone number data store and the received transmit picture data in the picture data store, reading a telephone number of the transmitter and a telephone number of the relaying apparatus by the central processing unit, reading a telephone number of one of the receivers by the central processing unit, determining whether a toll number is included in the telephone number of the receiver, determining, when a toll number is found, whether the toll number is identical with a toll number of the relaying apparatus, determining, if the toll numbers are identical, whether a local office number and a subscriber's number of the receiver are identical with a local office number and a subscriber's number of the relaying apparatus, and reading the picture data by the central processing unit to print out the picture data when the local office numbers and the subscriber's numbers are individually identical.

The above and other objects, features and advantages of the present invention will become apparent from the following detailed description taken with the accompanying drawing.

BRIEF DESCRIPTION OF THE DRAWING

FIGS. 2A and 2B are a flowchart demonstrating a procedure for identifying a toll number included in a telephone number.

DESCRIPTION OF THE PREFERRED EMBODIMENT

While the facsimile relaying method of the present invention is susceptible of numerous physical embodiments, depending upon the environment and requirements of use, a substantial number of the herein shown and described embodiment have been made, tested and used, and all have performed in an eminently satisfactory manner.

Figure 1:
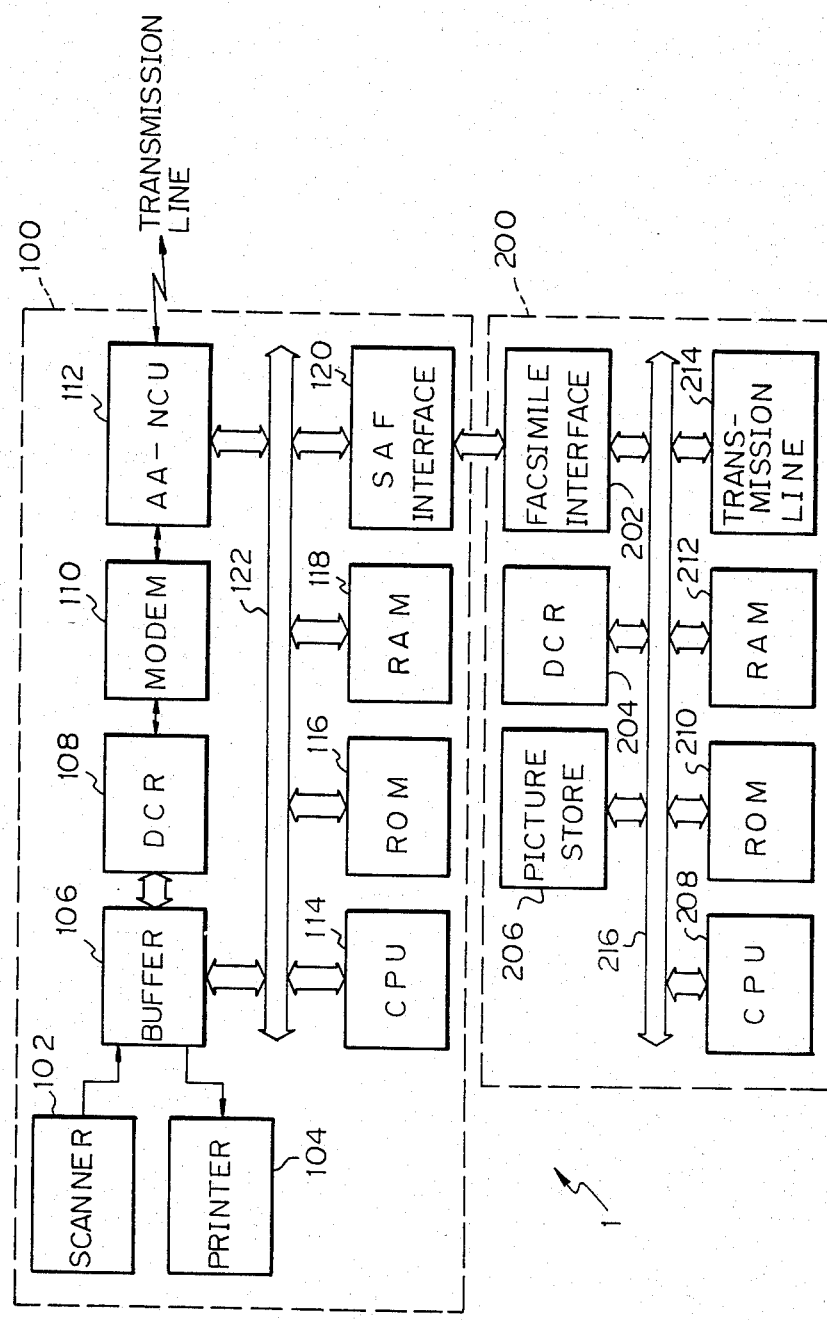
FIG. 1 is a block diagram of an apparatus for practicing a facsimile relaying method in accordance with the present invention.

Referring to FIG. 1 of the drawing, a facsimile relaying apparatus in accordance with one embodiment of the present invention is shown and generally designated by the reference numeral 1. As shown, the relay 1 comprises a facsimile section 100 and a store and reproduce section 200.

The facsimile section 100 includes a scanner 102 for developing a transmit picture signal by scanning a document and photoelectrically converting the picture signal, and a printer 104 for printing out a dot pattern which corresponds to a record picture. A buffer 106 converts an output signal of the scanner into an 8-bit parallel signal and, at the same time, converts an output of a code compansion circuit (DCR) 108 into a serial signal to deliver it to the printer 104. The code compansion circuit 108 encodes data output from the buffer 106 to apply the coded data to a modem 110, while decoding or expanding receive data supplied thereto from the modem 110. A network control unit (AA-NCU) 112 is furnished with an automatic dialling function and an automatic receiving function so that it may establish and insterrupt the transmission line by controlling a telephone network or like transmission network.

The scanner 102, printer 104, buffer 106, code compansion circuit 108, modem 110 and network conrol unit 112 are commonly controlled by a central processing unit (CPU) 114. A read only memory (ROM) 116 is adapted to store a program to be executed by the CPU 114, and a random access memory (RAM) 118 to constitute a work area and the like for the CPU 114. An external store interface circuit (SAF interface) 120 allows the facsimile section 100 and the store and reproduce section 200 to exchange data therethrough. The buffer 106, network conrol 112, CPU 114, ROM 116, RAM 118 and external store interface 120 are individually connected to a system bus line 122.

The store and reproduce section 200 includes a facsimile interface circuit 202 which is connected to the external store interface circuit 120 in order to cause data exchange to occur between the facsimile section 100 and the store and reproduce section 200. A code compansion circuit (DCR) 204 compresses picture data applied thereto via the facsimile interface 202 in order to regulate the capacity of a picture store 206, while expanding data stored in the picture store 206 to reproduce the original picture data. The facsimile interface 202, code compansion circuit 204 and picture store 206 are commonly controlled by a central processing unit (CPU) 208. A ROM 210 stores a program which the CPU 208 executes, while a RAM 212 serves as a work area for the CPU 208 and, at the same time, memorizes telephone numbers (inclusive of toll numbers) of a transmitter, receivers and its own station as well as other data. A subsection 214 for data entry comprises ten keys, function keys and others which are arranged on a control panel (not shown) in the store and reproduce section 200. The facsimile interface 202, code compansion circuit 204, picture store 206, CPU 208, ROM 210, RAM 212 and input subsection 214 are commonly connected to an internal bus line 216.

Figure 2B:
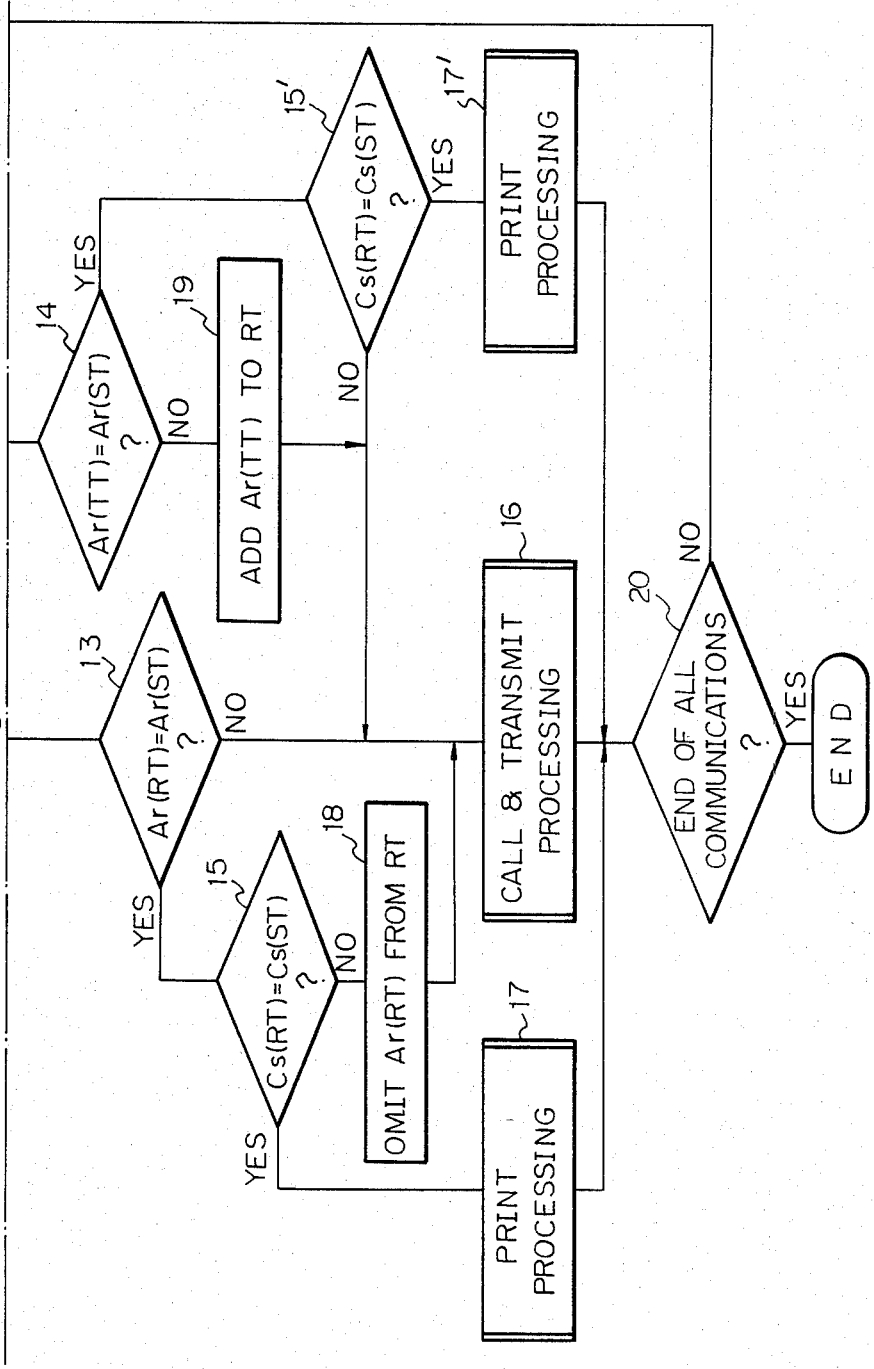

Assume that the relay station (facsimile relay apparatus) 1 having the above construction has received from a transmit station (facsimile transmitter) telephone number data indicative of a plurality of receive stations (facsimile receivers) and picture data to be transmitted. Then, the CPU 114 and CPU 208 cause the RAM 212 in the store and reproduce section 200 to store the telephone number data associated with the transmit and receive stations. Thereafter, the relay station 1 executes a control concerned with the identification of a toll number which is assigned to each of the receive stations in accordance with the procedure shown in FIG. 2. In FIG. 2, "TT", "RT" and "ST" represent telephone numbers of the transmit, receive and relay stations respectively. Ar(X) represents a toll number of a telephone number X (TT, RT, ST), and Cs(X) represents a local office number and a subscriber's number of the telephone number X (TT, RT, ST).

First, the CPU 208 reads out the transmit station's telephone number TT and own station's (relay station) telephone number from the RAM 212 (processing 10) and, then, one of the receive station's numbers RT from the RAM 212 (processing 11). Performing a decision 12, the CPU 208 see if the telephone number RT includes a toll number and, if it does, advances to a decision 13 and, if not, to a decision 14.

Assuming that the telephone number includes a toll number, the CPU 208 determines by the decision 13 whether the toll number of the telephone number RT is identical with the own station's toll number Ar(ST). If the former is identical with the latter, the CPU 208 performs a decision 15 and, if not, a call and transmit processing 16 (which will be described) for transmitting picture data to the receive station.

By the decision 15, the CPU 208 sees if the specific local office number and subscriber's number are identical with those of the own station. If they are identical, meaning that the own station is the expected receive station, the CPU 208 performs a print processing 17 (which will be described) so that the own station's printer 104 prints out the picture information; if not identical, meaning that the receive station has the same local office number as the own station, the CPU 208 replaces the telephone number RT by a number produced by omitting the toll number Ar(RT) from the telephone number RT (processing 18). Based on the resulting telephone number RT, the CPU 208 runs the call and transmit processing 16.

When the telephone number RT does not include a toll number, the result of the decision 12 is YES. Then, the CPU 208 performs the processing 14 to determine whether the toll number of the transmit station is identical with that of the own station. If the result is NO, it is determined that the toll numbers of the transmit and receive stations are identical and the toll numbers of the transmit and own stations are different, that is, the receive and own stations are different in toll number from each other. Therefore, the CPU 208 replaces the telephone number RT by a number produced by adding the toll number Ar(TT) to the telephone number RT. The CPU 208 then performs the call and transmit processing 16 on the basis of the replaced telephone number RT. If the result of the decision 14 is YES showing that the toll numbers of the transmit and own stations are identical, the CPU 208 executes a decision 15' similar to the decision 15 and a print processing 17' similar to the print processing 17 because the toll numbers of the receive and own stations in this case are considered identical.

After the call and transmit processing 16 and print processing 17 or 17', the CPU 208 determines by a decision 20 whether the picture data has been completely sent out to all the expected receive stations and, if not, returns to the processing 11 to repeat the above procedure on the telephone number RT of the next receive station.

In the call and transmit processing 16, the telephone number RT set up by the CPU 208 is transferred to the CPU 114 which in turn transfers it to the network control 112. The network control 112 connects to the line and calls the receive station having the specific telephone number RT. In order to send out picture data by executing a predetermined facsimile procedure in cooperation with the receive station, the CPU 208 causes the compansion circuit 204 to convert the picture data stored in the picture store 206 into the original picture data. The reproduced data is fed to the CPU 114 which then transfers it to the modem 110 via the compansion circuit 108. In this manner, the picture data is transmitted to the receive station.

In the print processing 17 or 17', on the other hand, the CPU 208 transfers the picture data stored in the picture store 206 to the CPU 114 in the same manner as described. From the CPU 114, the picture data is fed to the printer 104 to be printed out thereby.

In summary, it will be seen that the present invention provides a facsimile relaying method which frees an operator to a transmit station from excessive manipulation and prevents him or her from entering unexpected data. This advantage is derived from the inherent construction wherein when the operator at the transmit station enters a telephone number to designate a receive station, the operator needs only to enter a local office number and a subscriber's number without any toll number if the receive station is common in local office number to the transmit station, as in ordinally telephone calls.

Various modifications will become possible for those skilled in the art after receiving the teachings of the present disclosure without departing from the scope thereof.

What is claimed is:

1. A facsimile relaying method which once stores in a picture store of a facsimile relaying apparatus picture information which is transmitted from a facsimile transmitter and, then, transmits the stored picture information to a plurality of facsimile receivers which are designated by the facsimile transmitter, said facsimile relaying method comprising the steps of:
   (a) adding a toll number included in a telephone number of the transmitter to a telephone number which designates any of the receivers, when said telephone number designating the facsimile receiver lacks a toll number; and
   (b) omitting a toll number from the telephone number which designates the receiver when the toll number is identical with a toll number of the relaying apparatus.

2. A facsimile relaying method which, using a facsimile relaying apparatus equipped with a telephone number data store, a picture data store and a central processing unit, sequentially transmits common picture information to a plurality of designated facsimile receivers for a facsimile transmitter, said facsimile relaying method comprising the steps of:
   (a) receiving from the transmitter telephone number data associated with the transmitter, telephone number data associated with the designated receivers and picture data to be transmitted;
   (b) storing the received telephone number data in the telephone number data store and the received transmit picture data in the picture data store;
   (c) reading a telephone number of the transmitter and a telephone number of the relaying apparatus by the central processing unit;
   (d) reading a telephone number of one of the receivers by the central processing unit;
   (e) determining whether a toll number is included in the telephone number of the receiver;
   (f) determining, when a toll number is found in step (d), whether the toll number is identical with a toll number of the relaying apparatus;
   (g) determining, if the toll numbers are identical in step (f), whether a local office number and a subscriber's number of the receiver are identical with a local office number and a subscriber's number of the relaying apparatus; and
   (h) reading the picture data by the central processing unit to print out the picture data when the local office numbers and the subscriber's numbers are individually identical at step (g).

3. A facsimile relaying method as claimed in claim 2, further comprising the steps of:
   (i) determining, if a toll number is absent in step (e), whether a toll number of the transmitter is identical with the toll number of the relaying apparatus;
   (j) adding the toll number of the transmitter to the telephone number of the receiver if the toll number of the transmitter is different from the toll number of the relaying apparatus; and
   (k) calling to transmit the picture data based on the telephone number of the receiver having the toll number which is added at step (j).

4. A facsimile relaying method as claimed in claim 3, further comprising the steps of:
   (1) determining whether a local office number and a subscriber's number of the receiver are identical with a local office number and a subscriber's number of the relaying apparatus if the toll numbers of the transmitter and the relaying apparatus are identical at step (i); and
   (m) reading out the picture data by the central processing unit to print out the picture data at the relaying apparatus if the local office numbers and the subscribers' numbers are individually identical at step (1).

5. A facsimile relaying method as claimed in claim 4, further comprising the step of:
   (n) calling to transmit the picture data based on the telephone number of the receiver if the local office numbers and the subscribers' numbers are individually different at step (1).

6. A facsimile relaying method as claimed in claim 2, further comprising the step of:
   (i) calling to transmit the picture data based on the telephone number of the receiver if the toll numbers are different at step (f).

7. A facsimile relaying method as claimed in claim 2, further comprising the step of:
   (i) omitting toll number from the telephone number of the receiver if the local office numbers and the subscribers' numbers are individually different at step (g); and
   (j) calling to transmit the picture data based on the telephone number of the receiver from which the toll number is omitted.

* * * * *